United States Patent [19]
Solomon et al.

[11] Patent Number: 5,948,094
[45] Date of Patent: Sep. 7, 1999

[54] METHOD AND APPARATUS FOR EXECUTING MULTIPLE TRANSACTIONS WITHIN A SINGLE ARBITRATION CYCLE

[75] Inventors: Gary A. Solomon; Norman J. Rasmussen, both of Hillsboro; Peter D. MacWilliams, Aloha, all of Oreg.

[73] Assignee: Intel Corporation, Santa Clara, Calif.

[21] Appl. No.: 08/932,745

[22] Filed: Sep. 17, 1997

Related U.S. Application Data

[63] Continuation of application No. 08/536,657, Sep. 29, 1995, abandoned.

[51] Int. Cl.⁶ ........................................... G06F 13/14
[52] U.S. Cl. ................................. 710/718; 710/113
[58] Field of Search ............................. 395/297, 293, 395/296, 298, 728, 729

[56] References Cited

U.S. PATENT DOCUMENTS

| | | | |
|---|---|---|---|
| 4,473,880 | 9/1984 | Budde et al. | 364/200 |
| 4,481,572 | 11/1984 | Ochsner | 364/200 |
| 4,481,583 | 11/1984 | Mueller | 364/300 |
| 4,791,562 | 12/1988 | Shima | 364/200 |
| 4,964,034 | 10/1990 | Jaskowiak | 364/200 |
| 4,969,120 | 11/1990 | Azevedo et al. | 364/900 |
| 5,111,424 | 5/1992 | Donaldson et al. | 395/725 |
| 5,179,667 | 1/1993 | Iyer . | |
| 5,193,193 | 3/1993 | Iyer | 395/725 |
| 5,202,966 | 4/1993 | Woodson | 395/325 |
| 5,239,631 | 8/1993 | Boury et al. | 395/325 |
| 5,241,632 | 8/1993 | O'Connell et al. | 395/325 |
| 5,255,373 | 10/1993 | Brockmann et al. | 395/325 |
| 5,301,332 | 4/1994 | Dukes | 395/725 |
| 5,519,438 | 5/1996 | Elliott et al. | 348/180 |
| 5,533,205 | 7/1996 | Blackledge, Jr. et al. | 395/297 |
| 5,539,902 | 7/1996 | Sakai et al. | 395/550 |
| 5,553,248 | 9/1996 | Melo et al. | 395/296 |
| 5,557,759 | 9/1996 | Crump et al. | 395/309 |
| 5,598,542 | 1/1997 | Leung | 395/297 |
| 5,621,898 | 4/1997 | Wooten | 395/297 |
| 5,623,672 | 4/1997 | Popat | 395/728 |

OTHER PUBLICATIONS

"PCI Local Bus Specifications", Version 2.1, Jul. 1, 1995.
"PCI Local Bus Specification, Revision 2.0," PCI Special Interest Group, (Apr. 30, 1993).
"PCI Local Bus Specification, Revision 2.1," PCI Special Interest Group, (Jun. 1, 1995).

*Primary Examiner*—Ayaz R. Sheikh
*Assistant Examiner*—Jigar Pancholi
*Attorney, Agent, or Firm*—Blakely, Sokoloff, Taylor & Zafman

[57] ABSTRACT

A method of arbitrating among bus agents, wherein a bus agent is permitted multiple transactions within a single arbitration cycle. An arbitration event is initiated, and a request from a bus agent is granted to that bus agent for executing a transaction. A timer is started and the transaction is executed. If the timer does not expire before the transaction is completed, another request from that same bus agent is granted to the bus agent for executing an additional transaction before a subsequent arbitration event is initiated.

25 Claims, 6 Drawing Sheets

METHOD AND APPARATUS FOR EXECUTING MULTIPLE TRANSACTIONS WITHIN A SINGLE ARBITRATION CYCLE

This is a continuation of application Ser. No. 08/536,657, filed Sep. 29, 1995, now abandoned.

FIELD OF THE INVENTION

The present invention relates to computer system arbitration architectures and more particularly to a method for executing multiple transactions within the same arbitration cycle.

BACKGROUND OF THE INVENTION

In a computer system, a bus may be thought of as the communication interlink between various components of the computer system. Different computer systems may use different types of bus architectures. One type of bus architecture is the Industry Standard Architecture (ISA) bus. Another is the Extended ISA (EISA) bus. A more recent bus architecture is the Peripheral Component Interconnect (PCI) Local Bus architecture. As described by the PCI Local Bus Specification, Revision 2.0 (1993), and Revision 2.1 (1995), the PCI Local Bus is a high performance bus that is intended as an interconnect mechanism between highly integrated peripheral controller components, peripheral add-in boards, and processor\memory subsystems.

In bus architecture schemes such as PCI, multiple components coupled to the bus must compete for ownership of the bus because only one component can initiate cycles on the bus at a time. Therefore, some mechanism is required to allow each of several components coupled to a bus some amount of access time to that bus in a fair and rational manner. This mechanism is known as arbitration.

A conventional arbitration scheme is described below in reference to FIG. 1. As shown in FIG. 1 an arbiter 10 is coupled to four agents 11 and a target 12. Each of agents A, B, C, and D desire communication with target 12. Arbiter 10 acts as the "traffic cop" determining which of the 4 agents 11 will be granted access to the resources necessary to allow communication with target 12. Arbiter 10 determines which agent will be granted ownership according to a particular algorithm. Arbiter 10 will initiate this algorithm during what is called an arbitration event, and will grant access to the winning agent with the highest priority. Arbiter 10 is designed to prevent any one agent from monopolizing system resources for too long a period of time.

Once the winning agent is granted ownership of the resource, the winning agent executes a transaction during the ensuing period of time after the arbitration event but before the next arbitration event. This period of time is called an arbitration cycle. A transaction executed by the winning agent during an arbitration cycle typically comprises an initial indication of an address, then data associated with that address is read from or written to the target. Multiple pieces of data may be read from or written to the target in a single transaction if each piece of data is associated with consecutive address locations.

After the winning agent has either completed its transaction or arbiter 10 decides that the agent has had enough access time to target 12, arbiter 10 will halt further access to target 12 by that particular agent. Subsequently, arbiter 10 will initiate another arbitration event to determine which of the four agents 11 should next be granted access to the system resources necessary to communicate with target 12.

Each time an agent is granted access to a system resource such as, for example, a bus, a certain amount of leadoff time (access latency) is required to initiate communication with the target before a transaction can be completed. This latency is the result of the time necessary for the target to provide or accept the initial data to or from the bus owner, respectively. However, once an agent has established communication with the target device, multiple transactions may be consecutively executed between that agent and its target device relatively quickly, with minimum overhead. Unfortunately, in conventional arbitration schemes, once an agent has completed execution of a single transaction its ownership of system resources is revoked and the arbiter initiates another arbitration event.

A fragmented access agent is an agent which reads or writes data to non-consecutive regions of target address space, or executes both read and write cycles, or executes some combination of both over the course of communicating with the target. Unfortunately, the conventional arbitration scheme described above can be a significant impediment to fragmented access agents. A conventional arbiter would not treat the agent's communication as a single transaction, as desired by the agent, but rather as a series of transactions. In this manner, the agent's communications are fragmented into multiple transactions executed over a series of arbitration cycles, with each transaction communicating only a fragment of the total data during each cycle. The conventional arbiter initiates one or more arbitration events between each fragment.

As discussed above, a significant amount of overhead time is associated with each arbitration cycle. Therefore, while each successive transaction executed by a fragmented access agent may entail communication of data fragments with the same target device, the speed with which all the data fragments are communicated to or from the target device is significantly slowed by the act of rearbitration between each transaction. In an application in which an agent collects data and the target stores data, such slowing of communication between the agent and the target requires that the agent be equipped with a larger memory buffer for holding the data before it is downloaded to the target device. A larger memory buffer for the agent translates into higher costs for that particular application.

SUMMARY OF THE INVENTION

It is an object of the present invention to provide an arbitration scheme which reduces the overhead time and expense associated with agents continually re-accessing the same system resources necessary to execute multiple transactions with a target device.

A method of arbitrating among bus agents is described wherein a bus agent is permitted multiple transactions within a single arbitration cycle. An arbitration event is initiated, and a request from a bus agent is granted to that bus agent for executing a transaction. A timer is started and the transaction is executed. If the timer does not expire before the transaction is completed, another request from that same bus agent is granted to the bus agent for executing an additional transaction before a subsequent arbitration event is initiated.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method of arbitrating among bus agents is described wherein a bus agent is permitted multiple transactions within a single arbitration cycle. The method involves using a timer to extend the arbiter's grant of resource ownership to an agent, thereby permitting the agent to do multiple transactions within a single arbitration cycle. This is accomplished by granting bus ownership to an agent for as long as two criteria are satisfied. First, the agent must be requesting ownership of the bus for executing a transaction, and second, the timer must not have expired. Consequently, it can be seen that the longer the timer, the more transactions an agent can execute within a single arbitration cycle. To allow for maximum flexibility, each of a plurality of timers can be individually programmed for each REQ#/GNT# pair.

An arbiter and method of arbitration which permits multiple transactions in a single arbitration cycle will be described in more detail below.

Figure 1:
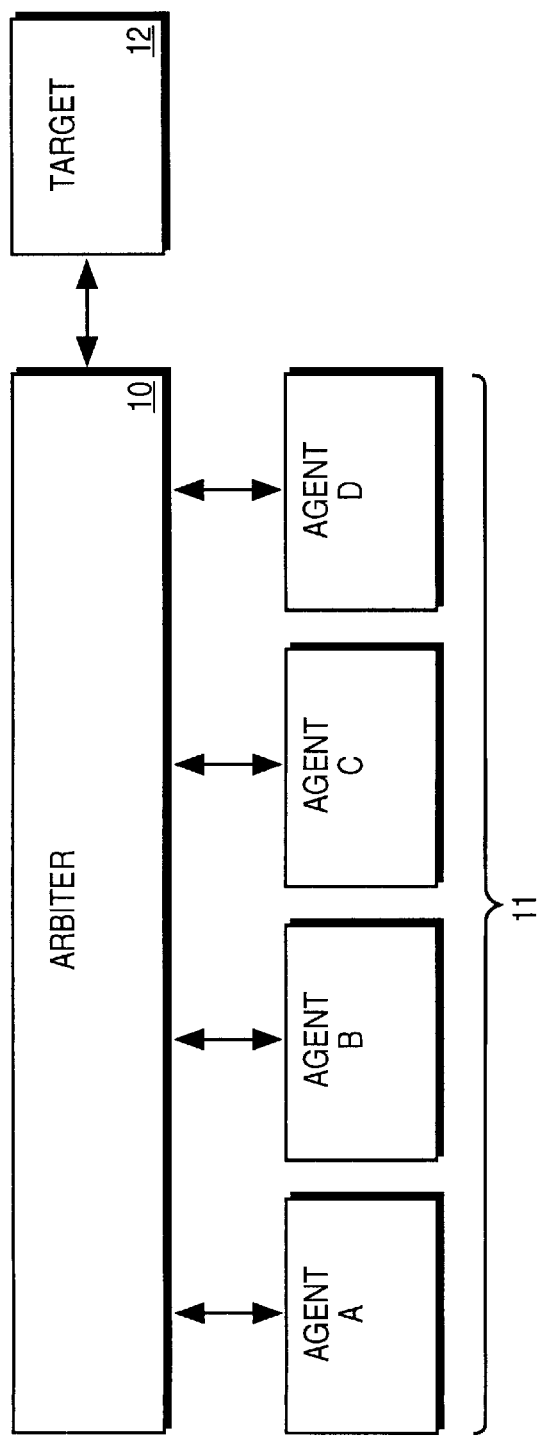
FIG. 1 is a block diagram of an arbitration system.
Figure 2A:
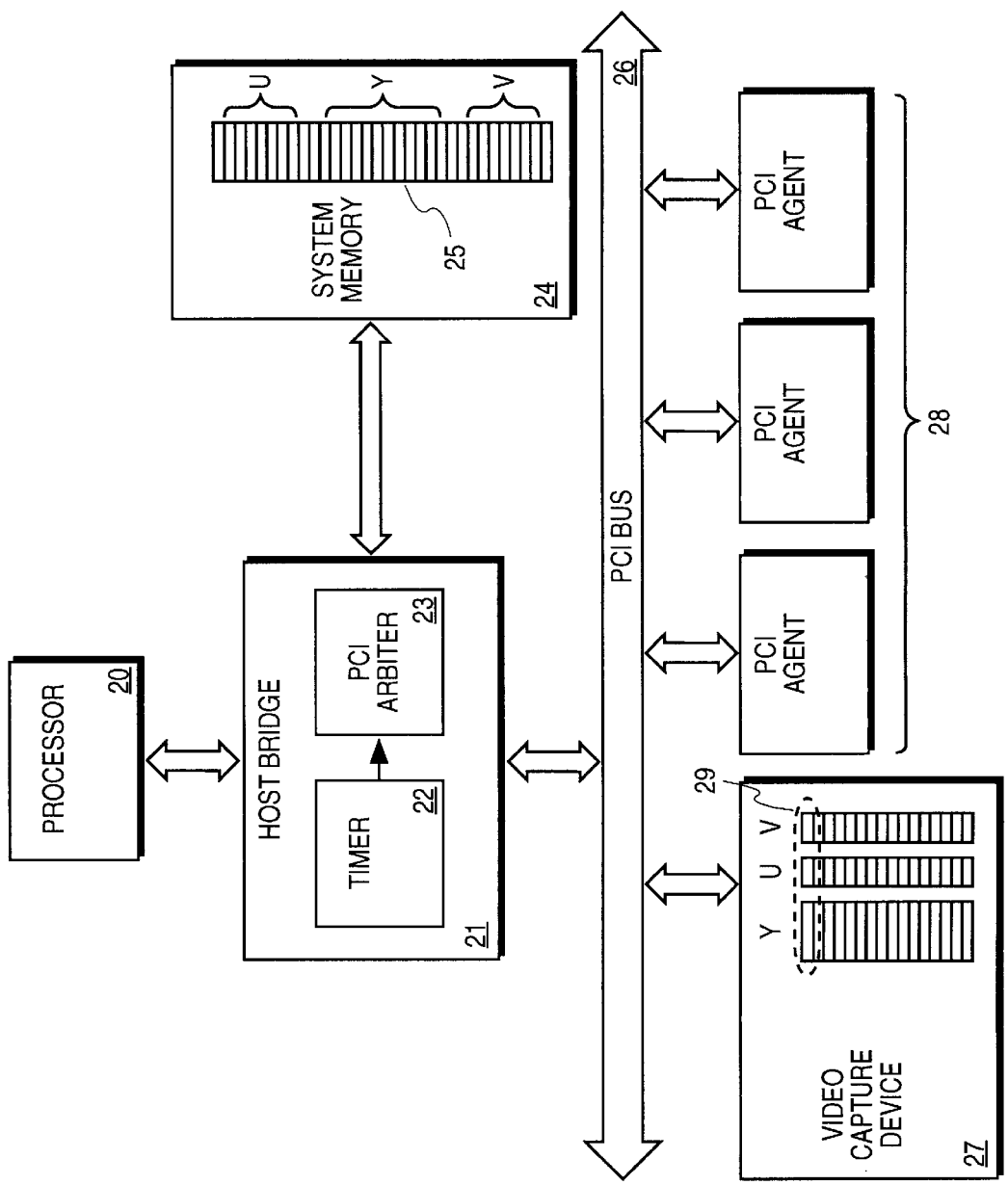
FIG. 2a is a block diagram of a computer system including peripheral components.

FIG. 2a is a block diagram of a computer system including a host bridge 21 which couples processor 20 to Peripheral Component Interconnect (PCI) bus 26. Host bridge 21 contains timer 22 coupled to PCI arbiter 23. Also coupled to host bridge 21 is system memory 24 which contains a plurality of memory buffers 25. Video capture device 27 is coupled to PCI bus 26, as are other PCI agents 28. Video capture device 27 contains buffers Y, U, and V for storing data.

Video capture device 27 competes with other PCI agents 28 coupled to PCI bus 26 for ownership of the PCI bus. Each agent on PCI bus 26 is coupled to PCI arbiter 23 within host bridge 21. PCI arbiter 23 determines which PCI agent on PCI bus 26 shall be granted ownership of the PCI bus during an arbitration event. Note that for purposes of this discussion, an arbitration event is one in which the arbiter considers requests from all possible agents, rather than some subset of agents, before granting ownership to the winning agent.

Video capture device 27 digitizes incoming pictorial data from a camera into Y, U, and V data elements and stores the Y, U, and V data in three separate buffers as shown. The data stored in the Y buffer represents the luminance of the image which is a weighed sum of the red, blue, and green aspects of the image. Data stored in the U buffer represents the red-weighted chromanance value of the image, and data stored in the V buffer represents the blue-weighted chromanance value of the image. The full color image can then be reassembled by properly combining associated data from each of the Y, U, and V buffers within video capture device 27. Therefore, a single data package 29 comprises several smaller data fragments from each of buffers Y, U, and V.

Video capture device 27 intends that each of the three data fragments in buffers Y, U, and V collectively comprise a single data package to be communicated as quickly as possible to system memory 24 for storage. However, system memory 24 stores each of fragments Y, U, and V in separate regions of system memory, as shown in memory buffers 25. While Y data within data package 29 is stored in a set of consecutive address locations in system memory buffers 25, these address locations are not contiguous with respect to the sets of consecutive address locations used to store either U or V data. As such, the storage of each of the three data fragments Y, U, and V of data package 29 are treated as three separate transactions by PCI arbiter 23.

Therefore, to allow the entire YUV data package 29 to be stored in system memory 24 within a single arbitration cycle, PCI arbiter 23 must grant video capture device 27 ownership of PCI bus 26 for a period of time long enough to allow all three transactions to occur. The addition of a timer 22 coupled to PCI arbiter 23 makes this possible by extending the PCI arbiter's grant to video capture device 27 for a pre-determined period of time. This pre-determined period of time is chosen to be long enough to allow video capture device 27 to execute three transactions so that all of the data within data package 29 can be stored in system memory 24 within a single arbitration cycle.

In the embodiment shown in FIG. 2a, PCI agents 27 and 28, coupled to PCI bus 26, compete for ownership of the PCI bus, while PCI arbiter 23, also coupled to PCI bus 26, initiates an arbitration event. If video capture device 27 has the highest priority according to the algorithm implemented by PCI arbiter 23, then video capture device 27 will be granted ownership of PCI bus 26. At this time, timer 22 is started and will, in conjunction with the current owner's bus request, dictate whether the current owner's grant will be extended or not.

Once video capture device 27 has been granted ownership of PCI bus 26, video capture device 27 proceeds to establish communication with system memory 24. Once communication has been established, video capture device 27 will proceed to execute a first transaction involving downloading the Y data fragment within data package 29 into consecutive address locations within the Y block of memory buffers 25. During or upon completion of this first transaction, PCI arbiter 23 will check timer 22 along with the request status of video capture device 27. If the timer has not yet expired and video capture device 27 requests ownership of PCI bus 26 for execution of a second transaction, PCI arbiter 23 will grant ownership of PCI bus 26 to the video capture device before initiating another arbitration event. Note that requesting ownership of a bus for execution of a transaction comprises either the act of continuing to request or re-requesting ownership of the bus. Similarly, granting ownership of a bus for execution of a transaction comprises either the act of continuing to grant or re-granting ownership of the bus.

Next, upon being granted ownership of PCI bus 26, video capture device 27 will download the U data fragment within data package 29 to locations within the U block of memory buffers 25 of system memory 24. Again, during or upon completion of this second transaction, PCI arbiter 23 will check the status of timer 22 and the request status of video capture device 27. If the timer has not yet expired and video capture device 27 requests ownership of PCI bus 26 for execution of a third transaction, PCI arbiter 23 will grant ownership of PCI bus 26 to video capture device 27 for execution of this third transaction before initiating another arbitration event.

Upon being granted ownership of PCI bus 26, video capture device 27 will download the V data fragment from data package 29 into locations within the V block of memory buffers 25 of system memory 24. During or upon completion of this third transaction PCI arbiter again checks the status of timer 22 along with the request status of video capture device 27. If either timer 22 has expired or video capture device 27 no longer requests ownership of PCI bus 26 for execution of a subsequent transaction, PCI arbiter 23 then initiates an arbitration event to check the request status of all PCI agents on PCI bus 26 and grants ownership of PCI bus 26 to the winning agent.

Figure 2B:
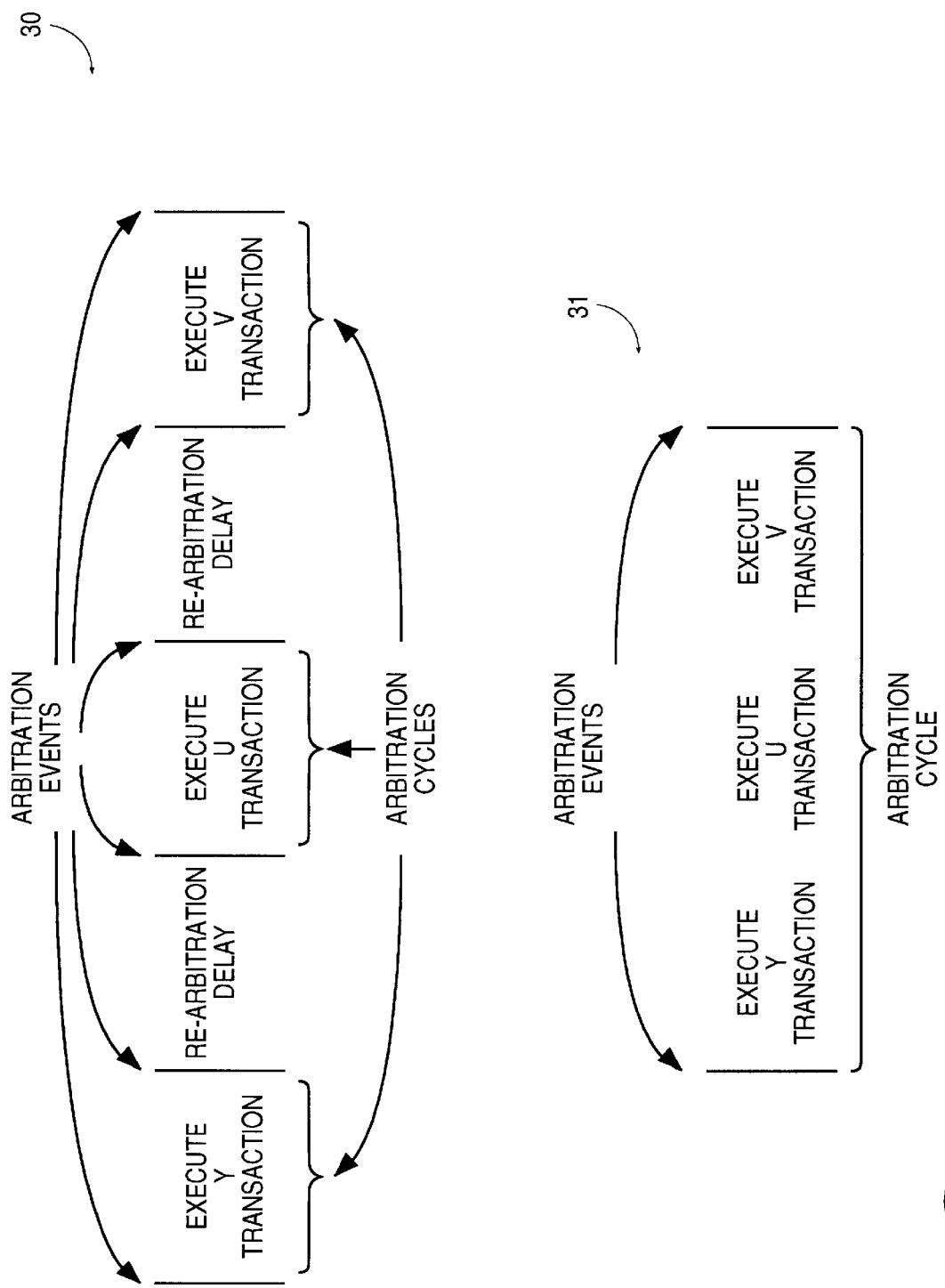
FIG. 2b is a time chart showing the time associated with executing multiple transactions with two different timer settings.

For an alternate embodiment, the timer is set to expire in a period of time shorter then the shortest transaction which can be executed by the PCI agent. In this embodiment, the PCI arbiter will behave in a more conventional manner, allowing only one transaction per arbitration cycle. This embodiment is shown by the arbitration time chart 30 of FIG. 2b. After an arbitration event, the first transaction of downloading the Y data fragment is executed during an arbitration cycle. Then, a re-arbitration delay occurs which includes any of a number of arbitration events and arbitration cycles involving other bus agents. Eventually, the arbiter re-grants bus ownership back to video capture device 27 at which time the transaction involving downloading the U data fragment is executed during a separate arbitration cycle. Then, another re-arbitration delay occurs until, finally, the arbiter re-grants bus ownership back to video capture device 27 at which time the transaction involving downloading the V data fragment is executed during another arbitration cycle.

As discussed above, there is a certain amount of time associated with arbitration events during which no transactions are occurring on the bus for a certain number of clock cycles. This time is referred to as "dead time". By employing a timer in accordance with one embodiment of the present invention, bus efficiency is improved because there are fewer arbitration events initiated for the same number of transactions, thereby reducing the dead time. For example, an embodiment in which the timer is long enough to allow the video capture device to execute all three transactions within a single arbitration cycle is shown by the arbitration time chart 31 of FIG. 2b. After an arbitration event, the first, second, and third transactions of downloading the Y, U, and V data fragments, respectively, are executed during a single arbitration cycle as shown. Comparing arbitration time charts 30 to 31 it can be seen that the re-arbitration delays associated with executing only one transaction per arbitration cycle significantly slow the speed with which the overall data package 29, comprising Y, U, and V data fragments, is downloaded into system memory. For an alternate embodiment, the timer is set to expire in an even longer period of time, allowing the PCI agent which is granted ownership of the bus to execute a greater number of transactions with its target device or devices. Also, for another embodiment, the arbiter considers requests from some subset of all possible agents before granting ownership to the agent which was the previous owner, all within the same arbitration cycle.

Note that the PCI arbiter initiates an arbitration event after a transaction has been executed if either the timer has expired or the current bus owner does not request ownership of the bus for execution of a subsequent transaction. Therefore, once the PCI arbiter senses that the timer has expired, it may initiate an arbitration event at the completion of the current transaction without checking the request status of the current bus owner. Likewise, once the PCI arbiter senses that the current bus owner no longer requests ownership of the bus for a subsequent transaction, the PCI arbiter may initiate an arbitration event at the completion of the current transaction without checking the status of the timer.

Figure 3:
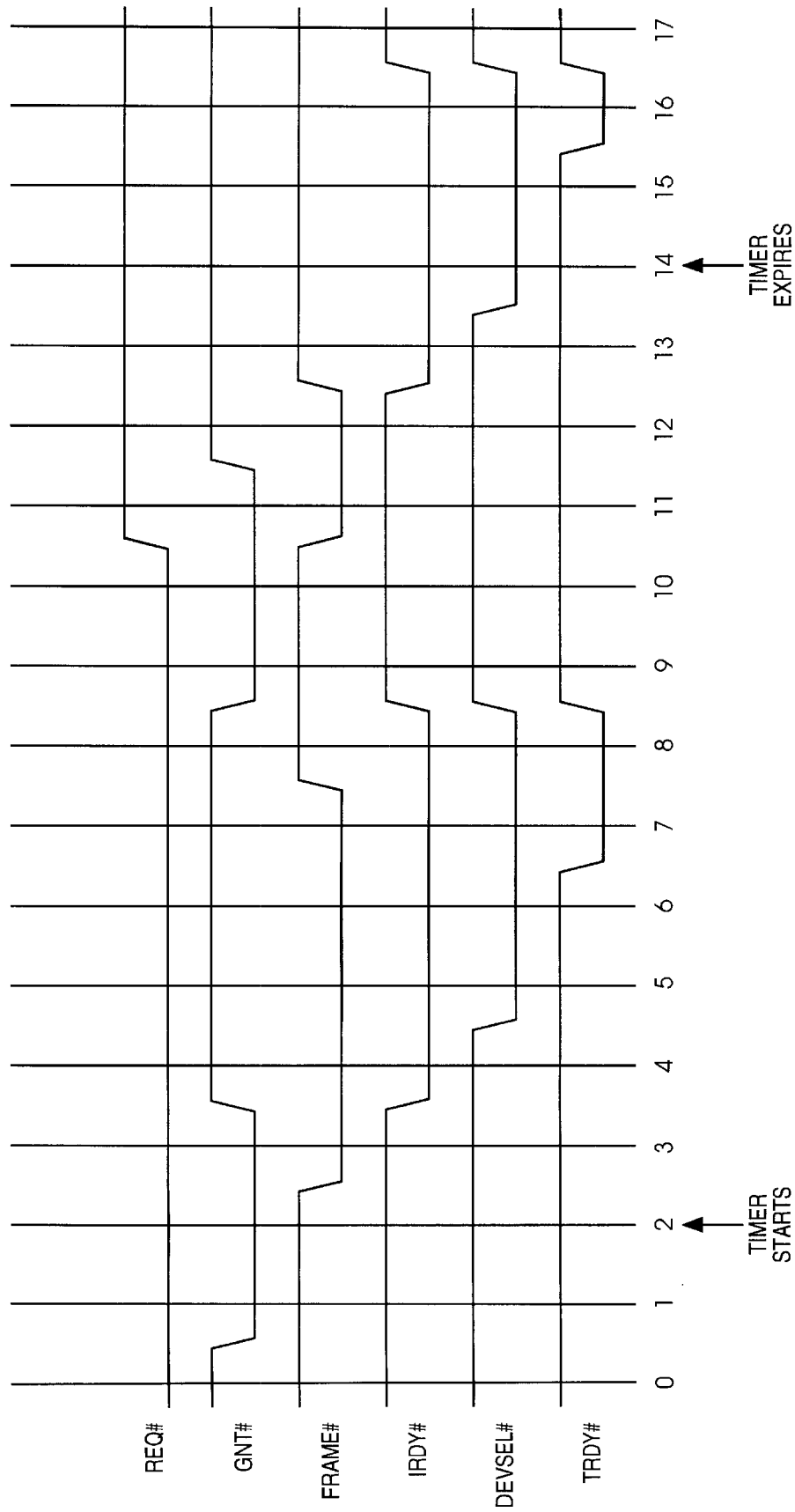
FIG. 3 is a timing diagram showing bus and arbiter protocol.

FIG. 3 is a timing diagram in which signal line designations ending in a pound sign ("#") indicate a signal that is asserted by placing the signal line in a logic low state. Signal lines REQ#, GNT#, FRAME#, IRDY#, DEVSEL#, TRDY#, and other signals of the PCI interface are described in more detail in the PCI Local Bus Specification, Revision 2.0 (1993), and Revision 2.1 (1995). At clock cycle 0, the only signal line which is asserted is REQ#, indicating that an agent is requesting ownership of the bus for executing a first transaction. At clock cycle 1 the arbiter has acknowledged the agent's request and asserts GNT#, indicating that the arbiter is granting the agent's request. At clock cycle 2, the timer is started. Note that the timer can be triggered by a signal on any one of a number of signal lines including, for example, GNT# or FRAME#. In addition, the timer may be started within 1, 2, 3, or any number of clock cycles from the triggering signal.

At clock cycle 3, signal line FRAME# is asserted, thereby initiating the first transaction of the current arbitration cycle. At clock cycle 4, GNT# is deasserted. In addition, IRDY# is asserted to indicate that the initiator, the bus agent in this embodiment, is ready to communicate. At clock cycle 5, DEVSEL# is asserted by the target device to indicate that the target device contains the address which the initiating bus agent desires. By clock cycle 7, TRDY# is asserted, indicating that the target is ready to supply or accept data in communication with the initiating bus agent. During clock cycles 7 and 8, a data exchange between the target device and the bus agent occurs.

Note that at clock cycle 8 the bus agent is asserting REQ#, indicating that the bus agent has another transaction to be executed. Moreover, REQ# remains asserted throughout the entire execution of the first transaction. For one embodiment of the present invention, the arbiter checks that status of the timer and samples the REQ# signal line at clock cycle 8. If the timer hasn't expired and REQ# is asserted, as is the case here, the arbiter reasserts GNT# at clock cycle 9, indicating that the bus agent which currently owns the bus may execute another transaction. For an alternate embodiment, the timer status and REQ# signal line are checked by the arbiter at any time during or soon after execution of the first transaction to determine if ownership of the bus will be re-granted to the current bus owner for execution of a second transaction. For another embodiment, the arbiter may continually assert GNT# to the bus agent executing the current transaction, and simply maintain this assertion to permit execution of a second transaction as long as the timer hasn't expired and REQ# is asserted.

During execution of the second transaction at clock cycle 11 in FIG. 3, FRAME# is asserted by the bus agent in response to the arbiter's grant of the bus agent's request. Concurrently, the bus agent deasserts REQ#, indicating that the bus agent has no additional transactions to be executed. As shown, the timer expires at clock cycle 14. Therefore, in accordance with the embodiment shown in FIG. 3, an arbiter, in conjunction with a timer, permits a bus agent to execute two back-to-back transactions without initiating an arbitration event in-between.

Note that as shown in FIG. 3, the bus agent does not request any additional transactions since the bus agent deasserts REQ# upon initiating its second transaction. In addition, the timer length has been programmed to last for only 12 clock cycles. For an alternate embodiment, however, the bus agent may continue to assert REQ# to the arbiter, indicating the bus agent's desire to execute additional transactions. In such an embodiment, the timer may be programmed to expire in any number of clock cycles which a programmer deems appropriate for execution of multiple transactions to improve system efficiency.

Figure 4:
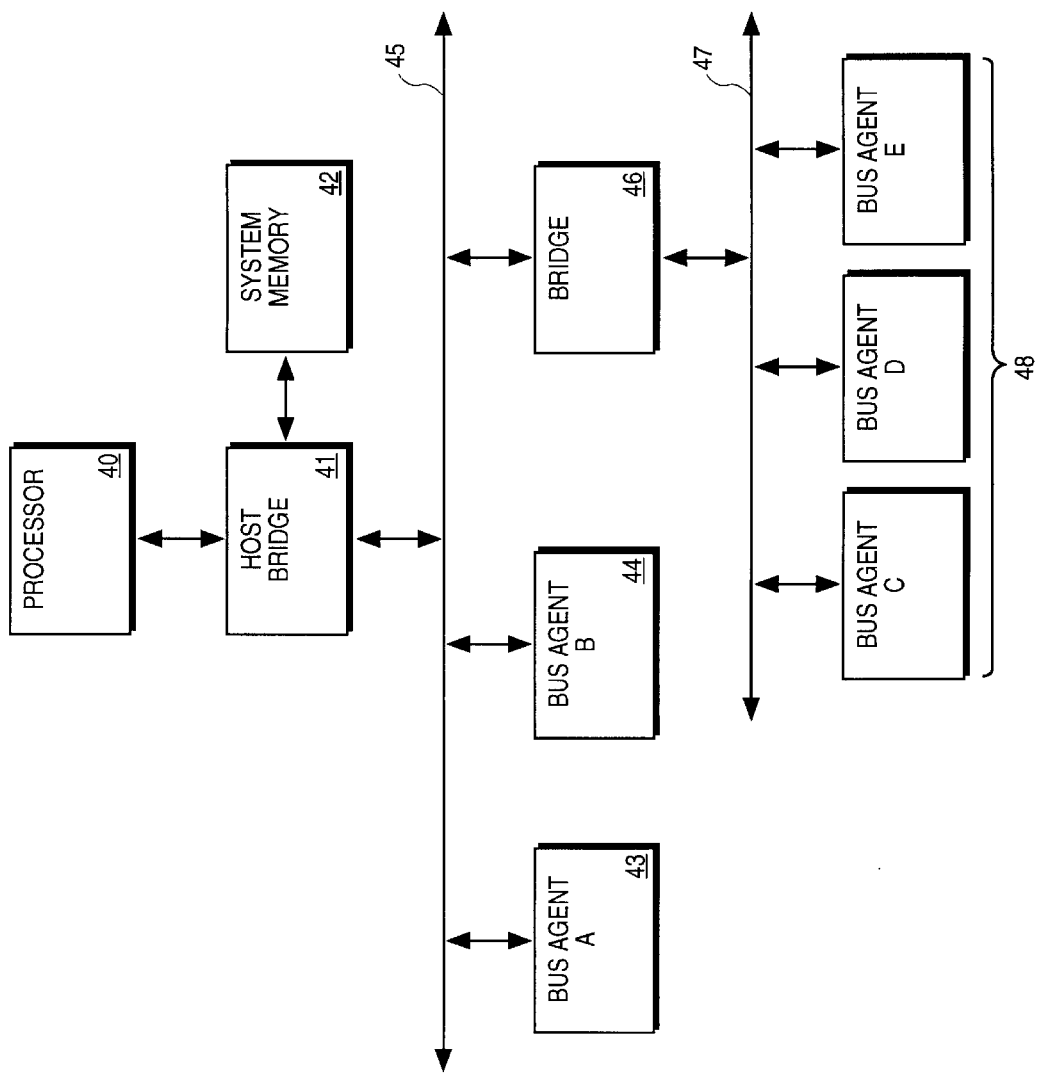
FIG. 4 is a block diagram of a computer system including peripheral components and a secondary bridge.

FIG. 4 is a block diagram of a computer system including a processor 40 coupled to a primary PCI bus 45 through host bridge 41. System memory 42 is additionally coupled to host bridge 41 so that both processor 40 and agents coupled to PCI bus 45 can communicate with system memory 42. Bus agent A 43, bus agent B 44, and bridge 46 are coupled to primary PCI bus 45. Secondary bus 47 is coupled to primary bus 45 through bridge 46. Bus agents C, D, and E, 48, are coupled to secondary bus 47. For the embodiment shown in FIG. 4, secondary bus 47 is an Industry Standard Architecture (ISA) bus. However, for an alternate embodiment, secondary bus 47 may be an Extended ISA (EISA) bus or a PCI bus.

For one embodiment, the bus agents 48 on secondary bus 47 each have information to be communicated to bus agent A 43, or require information from bus agent A 43. Therefore, in this embodiment, bus agent A is the target device. However, because of the significant time delay which could be incurred for each of bus agents 48 to independently access and communicate with bus agent A in real time, it is desirable to make use of write and/or read prefetch buffers within bridge 46. In this manner, when the arbiter within host bridge 41 grants a request to bridge 46, the data within these buffers of bridge 46 is communicated to, or information is read from, bus agent A 43, over the course of multiple transactions within a single arbitration cycle.

From the point of view of primary bus 47, the data from bus agents 48, temporarily stored in memory buffer locations within bridge 46, is fragmented because it can only be dealt with by executing multiple transactions. During an arbitration event, the arbiter within host bridge 41 considers requests from all possible agents, which are, as shown in FIG. 4, bus agents 43, 44, and bridge 46. At the completion of one of the arbitration events initiated by the arbiter, bridge 46 is eventually granted ownership of primary bus 45 for execution of a transaction with bus agent A 43. In accordance with one embodiment of the present invention, a timer coupled to the arbiter within host bridge 41 is programmed to expire in enough time to permit bridge 46 to execute multiple transactions with bus agent A 43 before the arbiter initiates another arbitration event. In this manner, fragmented data associated with each of bus agents 48 can be communicated to or from target bus agent A 43 by bridge 46 within the same arbitration cycle.

For an alternate embodiment, a bridge coupling a primary bus to a secondary bus may require communication with the main memory of a computer system. Implementation of this embodiment is described in reference to the system of FIG. 4 wherein system memory 42 is the target. For one particular embodiment, like video capture device 27 of FIG. 2a, bridge 46 independently buffers fragmented data, such as, for example, data from multiple secondary bus agents, into temporary memory buffers before downloading to system memory. During an arbitration event, the arbiter within host bridge 41 considers requests from all possible agents. At the completion of one of the arbitration events initiated by the arbiter, bridge 46 is eventually granted ownership of primary bus 45 for execution of a transaction with system memory 43. A timer coupled to the arbiter within host bridge 41 is programmed to expire in enough time to permit bridge 46 to execute multiple transactions with system memory 42 before the arbiter initiates another arbitration event. In this manner, fragmented data associated with each of bus agents 48 can be communicated to or from the target system memory 42 by bridge 46 within the same arbitration cycle.

Figure 5:
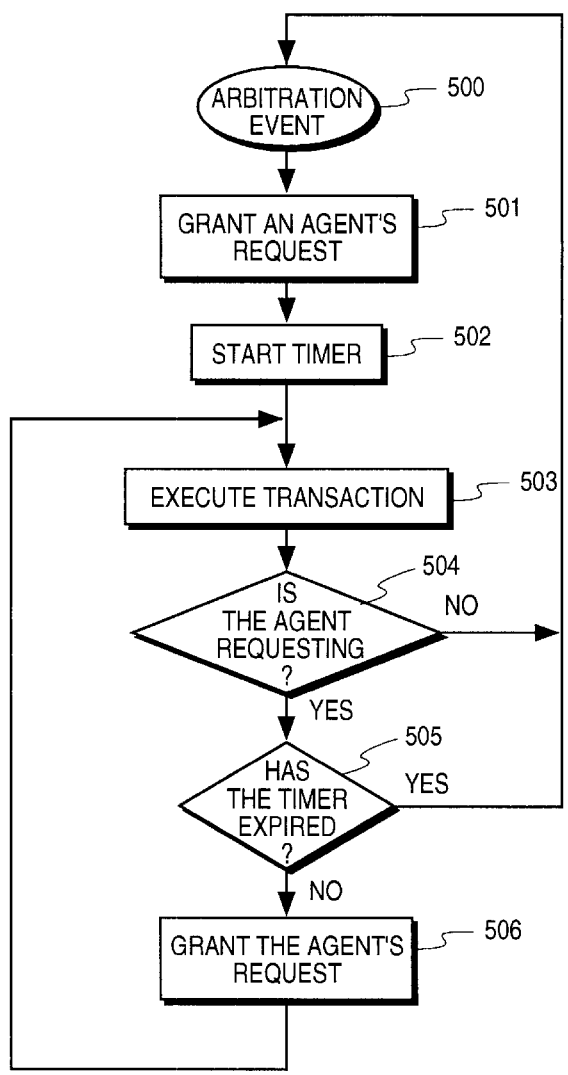
FIG. 5 is a flow chart in accordance with an embodiment of the present invention.

FIG. 5 is a flow chart in accordance with an embodiment of the present invention. At step 500 an arbiter initiates an arbitration event, sampling requests from various agents to which it is coupled. According to a particular algorithm, the arbiter grants the winning agent's request at step 501. The arbiter grants this winning agent ownership of the resource associated with the arbiter.

At step 502 a timer is started. This timer is coupled to the arbiter and, in accordance with one embodiment, is started once the arbiter asserts a grant signal to the winning bus agent. However, for an alternate embodiment of the present invention, the timer is started within any number of clock cycles from a triggering signal. The triggering signal may be any one of a number of signals including the assertion of GNT#, FRAME#, or IRDY#. For one embodiment of the present invention this timer is user programmable. However, for an alternate embodiment the length of the timer is hardwired with a fixed value into the system or pre-set by a manufacturer. For one embodiment, the timer is individually programmable or hardwired with a fixed value for each of the REQ#/GNT# pairs, whereas for another embodiment, the programmed or hardwired length of the timer applies to all REQ#/GNT# pairs or groups of REQ#/GNT# pairs.

At step 503 the transaction is executed. In accordance with one embodiment of the present invention the arbiter implements steps 504 and 505 just before the current transaction at step 503 is completed. However, for another embodiment steps 504 and 505 may be implemented earlier in the execution of the transaction or at some pre-determined period of time after the transaction of step 503 has been completed. Also, for one embodiment of the present invention, simple logic hardware is used to implement both steps 504 and 505 simultaneously. However, for an alternate embodiment, steps 504 and 505 may be implemented independently, and either step may be executed before the other, as previously explained.

At step 504 the arbiter determines whether or not the agent which currently owns the resource is requesting continued ownership of that resource for the execution of a subsequent transaction. If not, the arbiter initiates another arbitration event back at step 500. If so, the arbiter additionally determines at step 505 whether or not the timer, started back at step 502, has expired. If the timer has expired, then the arbiter initiates another arbitration event back at step 500. If the timer has not expired, however, the arbiter proceeds to step 506.

At step 506 the arbiter grants ownership of the resource to the same agent determined back at step 501 without initiating a new arbitration event. For one embodiment of the present invention, the arbiter grants the agent's request by reasserting GNT# to the agent. For another embodiment, GNT# is continually asserted throughout the execution of the transaction, and, therefore, this assertion of GNT# is simply continued at step 506. After step 506, the next transaction is executed by the agent back at step 503, and steps 504, 505, and 506 are repeated for each subsequent transaction, all during the same arbitration cycle as the execution of the original transaction at step 503. The steps 503, 504, 505, and 506 are repeated until either the agent stops requesting or the timer expires, resulting in the arbiter initiating a new arbitration event back at step 500.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An arbitration method comprising the steps of:
   initiating a first arbitration event;
   granting a first request for ownership of a first bus from a first bus agent coupled to the first bus for executing a first transaction;
   starting a timer when the first request is granted;
   executing the first transaction;
   determining if the first bus agent is requesting continued ownership of the bus;
   initiating a second arbitration event if it is determined that the first bus agent is not requesting continued ownership of the first bus;
   if the first bus agent is requesting continued ownership of the bus,
   determining if the timer has expired; and
   granting a second request from the first bus agent for executing a second transaction before initiating the second arbitration event if the timer has not expired and initiating the second arbitration event if the timer has expired.

2. The arbitration method of claim 1, further comprising the steps of executing the second transaction and granting a third request from the first bus agent for executing a third transaction before initiating a second arbitration event if the timer has not expired.

3. The arbitration method of claim 1, wherein the timer is programmable by a user and applies to all REQ#/GNT# pairs.

4. The arbitration method of claim 1, wherein the timer is programmable by a user and applies to a single REQ#/GNT# pair, and a plurality of other timers, each of which being programmable by a user, applies to a plurality of other REQ#/GNT# pairs.

5. The arbitration method of claim 1, wherein the timer is hardwired with a fixed value and applies to all REQ#/GNT# pairs.

6. The arbitration method of claim 1, wherein the timer is hardwired with a fixed value and applies to a single REQ#/GNT# pair, and a plurality of other timers, each of which being hardwired with a fixed value, applies to a plurality of other REQ#/GNT# pairs.

7. The arbitration method of claim 1, wherein the first bus agent is a fragmented access bus agent and the first bus is a peripheral component interconnect (PCI) bus.

8. The arbitration method of claim 1, wherein the timer is started within a preset number of clock cycles of granting the first request.

9. The arbitration method of claim 1, wherein the first bus is a peripheral component interconnect (PCI) bus and the second request is granted by re-asserting GNT# for the first bus agent one clock cycle after the first bus agent de-asserts FRAME# if REQ# remains asserted by the first bus agent.

10. The arbitration method of claim 1, wherein the first bus is a peripheral component interconnect (PCI) bus and the second request is granted by maintaining an assertion of GNT# if REQ# remains asserted by the first bus agent.

11. The arbitration method of claim 7, wherein the fragmented access bus agent comprises a first buffer containing data which is written into a first set of consecutive address locations in a system memory during the first transaction, and a second buffer containing data which is written into a second set of consecutive address locations in the system memory during the second transaction, the first and second sets of consecutive address locations being located in separate regions of the system memory.

12. The arbitration method of claim 7, wherein the fragmented access bus agent is a bridge coupling the first bus to a second bus, a second bus agent and a third bus agent being coupled to the second bus, the second bus agent communicating with a target device during the first transaction, and the third bus agent communicating with the target device during the second transaction.

13. The arbitration method of claim 12, wherein the target device is coupled to the first bus.

14. The arbitration method of claim 12, wherein the target device is system memory.

15. An arbitration method, comprising the steps of:
    initiating a first arbitration event;
    granting a first request for ownership of a PCI bus from a fragmented access bus agent coupled to the PCI bus for executing a first transaction;
    starting a timer when the first request is granted;
    executing the first transaction;
    determining if the bus agent is requesting continued ownership of the PCI bus;
    initiating a second arbitration event if it is determined that the bus agent is not requesting continued ownership of the PCI bus;
    determining if the timer has expired;
    granting a second request from the bus agent for executing a second transaction before initiating the second arbitration event if the timer has not expired;
    executing the second transaction;
    determining if the bus agent is requesting continued ownership of the PCI bus;
    initiating a second arbitration event if it is determined that the fragmented access bus agent is not requesting continued ownership of the PCI bus;
    determining if the timer has expired;
    granting a third request from the bus agent for executing a third transaction before initiating the second arbitration event if the timer has not expired; and
    executing the third transaction before initiating the second arbitration event.

16. The arbitration method of claim 15, wherein the timer is programmable by a user.

17. The arbitration method of claim 15, wherein the timer is hardwired with a fixed value.

18. The arbitration method of claim 15, wherein the timer is started within approximately three clock cycles of granting the first request.

19. The arbitration method of claim 15, wherein the second request is granted by continuing an assertion of GNT# for the bus agent while REQ# remains asserted by the bus agent.

20. The arbitration method of claim 15, wherein the fragmented access bus agent is a video capture device comprising a first buffer containing data which is written into a first set of consecutive address locations in a system memory during the first transaction, a second buffer containing data which is written into a second set of consecutive address locations in the system memory during the second transaction, and a third buffer containing data which is written into a third set of consecutive address locations in the system memory during the third transaction, the first, second, and third sets of consecutive address locations being located in separate regions of the system memory.

21. A computer system, comprising:

a bus;

a bus agent coupled to the bus;

a bus arbiter coupled to the bus; and a timer coupled to the bus arbiter, the timer starting when a first arbitration request for a first transaction is granted;

the bus arbiter permitting the bus agent to execute multiple transactions within a single arbitration cycle by granting the bus agent ownership of the bus to execute the first transaction, granting the bus agent ownership of the bus to execute a second transaction if the bus agent continues to assert a request for ownership of the bus and the timer has not expired.

22. The computer system of claim 21, wherein the bus is a peripheral component interconnect (PCI) bus and the arbiter and the timer are contained within a bridge coupling the PCI bus to a processor and system memory.

23. The computer system of claim 21, wherein the timer is programmable by a user and is started within approximately three clock cycles of granting the bus agent ownership of the bus for executing a first transaction within the single arbitration cycle.

24. The computer system of claim 21, wherein the timer is hardwired with a fixed value and is started within approximately three clock cycles of granting the bus agent ownership of the bus for executing a first transaction within the single arbitration cycle.

25. The computer system of claim 22, wherein the bus agent comprises a first buffer containing data which is written into a first set of consecutive address locations in the system memory during a first transaction, and a second buffer containing data which is written into a second set of consecutive address locations in the system memory during a second transaction, the first and second sets of consecutive address locations being located in separate regions of the system memory, and the first and second transactions being executed within the single arbitration cycle.

* * * * *